United States Patent [19]

Louis

[11] Patent Number: 4,646,597
[45] Date of Patent: Mar. 3, 1987

[54] PUSHER HEAD FOR FEEDER FOR AUTOMATIC LATHE

[75] Inventor: Alexandre Louis, Le Landeron, Switzerland

[73] Assignee: Societe de vente et de fabrication pour le decolletage LNS SA, Orvin, Switzerland

[21] Appl. No.: 794,858

[22] PCT Filed: Mar. 5, 1985

[86] PCT No.: PCT/CH85/00039
§ 371 Date: Oct. 17, 1985
§ 102(e) Date: Oct. 17, 1985

[87] PCT Pub. No.: WO85/03892
PCT Pub. Date: Sep. 12, 1985

[30] Foreign Application Priority Data

Mar. 5, 1984 [CH] Switzerland ............... 1088/84

[51] Int. Cl.⁴ ............................................. B23B 25/00
[52] U.S. Cl. ..................................... 82/38 R; 279/1 J; 414/18
[58] Field of Search ............... 82/38 R; 414/17, 18; 279/1 J, 1 L, 1 Q, 41 A, 102

[56] References Cited

U.S. PATENT DOCUMENTS

| | | | |
|---|---|---|---|
| 906,040 | 12/1908 | Lucas | 279/102 |
| 2059308 | 4/1981 | GBX . | |
| 2,118,301 | 5/1938 | Gegenheimer et al. . | |
| 2,741,482 | 4/1956 | Abramoska | 279/41 A |

FOREIGN PATENT DOCUMENTS

| | | |
|---|---|---|
| 874546 | 4/1953 | Fed. Rep. of Germany . |
| 900066 | 12/1953 | Fed. Rep. of Germany . |
| 1201904 | 8/1970 | United Kingdom . |
| 2049504A | 12/1980 | United Kingdom . |

Primary Examiner—Leonidas Vlachos
Attorney, Agent, or Firm—Parkhurst & Oliff

[57] ABSTRACT

In order to permit the use of bars of material to be machined without a preliminary preparation of the rearward end of the bar being necessary, the pusher head presents ribs extending inwardly, and the surfaces of which directed toward the axis form cone portions. Between these ribs are free spaces where possible burrs may lodge. The ribs include shearing edges for eliminating the burrs if the burr is located on a rib, rather than in the free space. Furthermore, the angle of conicity is small. Thus, a rear bar face in rough state, not having been prepared by straightening or taper turning, does not express itself by any appreciable decentering.

6 Claims, 5 Drawing Figures

PUSHER HEAD FOR FEEDER FOR AUTOMATIC LATHE

BACKGROUND AND SUMMARY OF THE INVENTION

The present invention relates to a pusher head for feeder for automatic lathe, intended to equip a pusher and to intervene leaning against the rearward end of a bar of material to be machined, to push this bar in the direction of the lathe, this head including, to fit against the bar, a front recess which presents at least one inside conical surface part.

In practically all automatic feeders for machine tools, typically for automatic lathes, there are bar-guiding tubes which contain a pusher provided at the front, i.e., in the direction of the lathe, with a pusher head which pushes the bar of material to be machined toward the lathe. The pusher head is rotary, as well as, in general, the body of the pusher situated behind its head. At the rear of the body of the pusher, the latter is joined to a piston or other device for the application of pressure, this latter being most often non-rotatable, its connection to the pusher being made by means permitting mutual rotation. An illustration of such a conventional pusher is to be found, for example, in the Swiss patent specification No. 514,381. An identical design is used in the "Hydrobar"- type feed apparatus, manufactured by the firm LNS in Orvin, and the leaflets and maintenance manuals of which are at the disposal of the public.

In general, the rearward end of the bar of material to be machined was prepared by machining giving it a cone shape or else creating a frustoconical surface at the edge of the rear face of the bar. This latter way of proceeding is, for example, illustrated in Chapter 3.4.1.1. on page 14 of the instruction manual (accessible to anyone) for the "Superhydrobar" feeder, manufactured by the firm LNS in Orvin (CH). This same necessity of preparing the rearward end of the bar frustoconically is illustrated in FIG. 2 of the present specification.

The reason why it was hitherto necessary to prepare, conically or frustoconically, the rear of the bar of material to be machined coming to lean against the pusher head is explained by a glance at FIG. 1 of the present specification. One finds that if the rearward end of the bar were not suitably prepared, the widely open cone-shaped recess one had in the conventional pusher heads was liable to position the rear of the bar of material in a non-centered manner relative to the axis of the pusher. This appears obviously if one considers the rear face of a bar of material to be machined, in the rough state, assuming, something which may easily happen at the time of sawing the bar lengths, that the rearward end face is not absolutely perpendicular to the axial direction. FIG. 1 shows that that leads to an eccentric shifting $e_1$ of the bar. Moreover, at the time of the preparatory sawing of the bar, it may frequently happen that the edge of the sawed face presents a burr of some kind, and, again, even if the rear face is perpendicular to the axis, this burr brings about an axial shifting $e_2$ of the bar if the latter is placed in its rough state against the pusher head. This is the reason why, until now, the rearward end of the bar of material to be machined was always prepared to create there a conical or frustoconical centered surface, as shown, for example, by the accompanying FIG 2.

This additional operation of preliminary preparation of the rear bar end before it is placed in a feeder bar-guiding tube increased the cost of the operations of feeding bars to an automatic machine tool, typically an automatic lathe.

It would be well to mention here two prior publications which, in a certain way, touch on the problem of the centering of a part or bar in a rotary tip presenting a recess which comprises at least parts of conical surface. It is a matter of the specifications U.S. Pat. No. 2,118,301 and GB-Pat. No. 2,059,308. To tell the truth, the rotary tips proposed by these specifications are not feeder pusher heads but really spindle or counter-spindle fittings of lathes.

The American specification proposes a rotary tip which includes a widely open conical recess (30° on the longitudinal axis). In connection with its FIGS. 5 and 6, this prior specification proposes providing the conical interior of the recess with ribs to prevent possible burrs of the part or bar end engaged from spoiling the centering of this part or bar. The burrs are supposed to enter the space between two ribs. If, however, a burr turns up directly at a rib, the non-spoiling of the centering first involves a rotation of the tip relative to the bar, failing which the burr spoils the centering nevertheless.

The British specification proposes a rotary tip presenting a frustoconical recess, free of any ribs, the angle of conicity of which is 8°30'. One notices that the rotary tip according to this British prior publication is intended to hold the end of a wooden bar in engagement on a wood-turning lathe. The gripping of a wooden bar end in the inside cone, of low conicity, of a metal tip necessarily involves a certain compression of the wood. The end of a bar of metal would react differently. In this British specification, the advantage of the conicity chosen is presented as residing in a gradual increase in the force. Nothing is said about an effect of improving the centering obtained by a relatively low conicity.

An object of the present invention is especially to provide a pusher head for feeder for automatic lathe which permits the use of a bar in its rough state, i.e., the rearward end of which need not have been previously prepared to obtain sufficient centering of the bar of material to be machined relative to the pusher head.

In accordance with the invention, this object is attained by the presence of the features recited in the accompanying claim 1.

Advantageously, the mentioned ribs are six in number, and the angle of conicity of the frustoconical sector-based surfaces is from 2° to 5° relative to the axial direction.

The very low conicity of the frustoconical surface portions which receive the rear bar end means that even a relatively oblique cutting-off of this rearward end, though it theoretically brings about a very slight de-centering of the bar, keeps this decentering at so insignificant a level that it can, without any doubt, be disregarded in practice. Moreover, the presence of possible burrs will not be disturbing, for at the moment when putting in place occurs, the burr will be lodged in the interstices between the ribs, where it will not disturb the centering of the bar, or else if the burr comes onto a rib, the latter will force it back toward the rear. In addition, the longitudinal edges of the ribs will be able, if necessary, to act as cutting edges to promote the forcing back of the burrs. The combination of the presence of the ribs and of the reduced conicity makes the arrangement according to the invention capable of forcing back suitably, and if necessary, of shearing off, rear bar face burrs or messy edges, until the bar is completely fitted in the pusher head with sufficient centering precision.

The invention attains the performance of remedying the risks of centering faults, which performance was not attained (not even suggested, made obvious) by the prior art.

BRIEF DESCRIPTION OF THE DRAWINGS

The accompanying drawing illustrates, by way of example and after two figures explaining the drawbacks of the prior art, an embodiment of the subject of the invention.

In this drawing.

DETAILED DESCRIPTION OF THE PREFERRED EMBODIMENT

Figure 1:
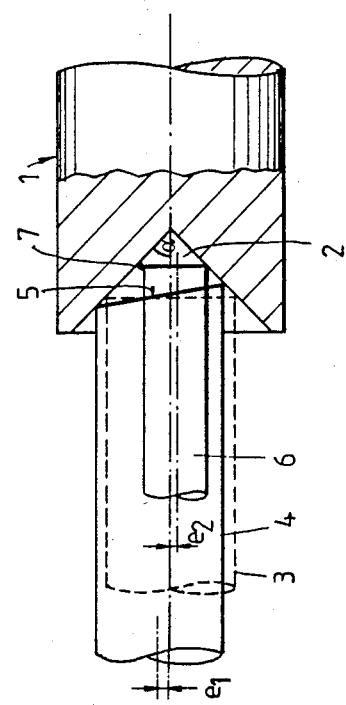
FIG. 1 is a view explaining schematically the drawbacks of the prior art in the case where a rearward end of a bar of material to be machined would have been placed in its rough state against a conventional pusher head.

FIG. 1, illustrating the drawbacks of the prior art, has already been briefly commented upon. It is seen there that in the case of a conventional pusher head, the placing of a bar of material to be machined still having its rearward end in rough state would be very liable to bring about a decentering $e_1$ or $e_2$ of the bar of material to be machined relative to the axis of the pusher head.

More precisely, in FIG. 1, the conventional pusher head 1 includes a recess 2, of inside conical shape, the conicity $\alpha$ of which is approximately 45°. It has been shown at 3, by means of a dotted dash line, how there would be positioned, in the conical recess 2, a bar of material to be machined of which the rear surface, even in rough state, would be clean, i.e., would be quite perpendicular to the axis of the bar and would not present any burr. Such a bar would indeed be positioned in a centered manner relative to the pusher head 1. However, there is little chance that the rear face in rough state (i.e., coming directly from the sawing or sectioning) of a bar of material to be machined would be clean, i.e., quite perpendicular to the axis and free of burrs. In the general case, it is necessary to consider the case of a bar of material 4 which, in rough state, presents a rear surface 5 which is not exactly perpendicular to its axis. In the drawing, in order to illustrate the situation well, the inclination of the rear face 5 has been exaggerated, but it is correct that, in reality, this rear face 5, in rough state, almost always presents a certain obliquity. It is seen that this results in a decentering $e_1$ of the bar 4 relative to the axis of the pusher head 1.

It is likewise necessary to consider the case of a bar of material to be machined 6 of which the rear surface in rough state, even cut perpendicular to the axis of the bar, would have a sawing burr 7. In this case, the effect of this burr 7 would likewise be to decenter the bar 6 relative to the axis of the pusher, as in shown at $e_2$.

Figure 2:
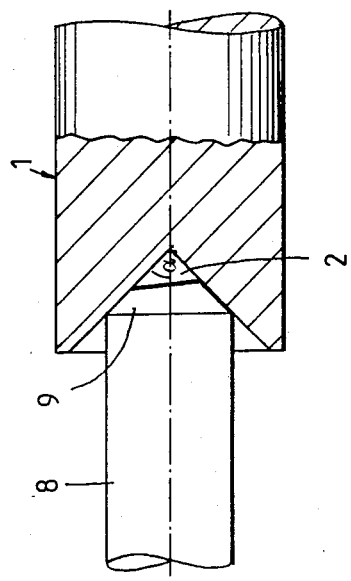
FIG. 2 illustrates, similarly to FIG. 1, the necessity there was, with the pusher heads according to the prior art, of preparing frustoconically (or conically) the rearward end of a bar of material to be machined against which the pusher head comes to act.

FIG. 2 shows how, according to the prior art, the drawbacks explained in connection with FIG. 1 have been remedied until now. For this purpose, the rearward end of the bar of material to be machined 8 was prepared, in the sense that a conical surface portion 9 was created there, having a conicity corresponding to that of the recess 2. In this case, a possible burr was naturally eliminated by this control preparation of the rearward end, and even if the rear face was not perpendicular to the axis, the conical surface portion 9, created by the preparation of the bar, was centered on the axis of the bar, which means that the bar, placed in the recess 2, would be positioned in a centered manner relative to the pusher head.

This way of doing it naturally gives satisfaction from the point of view of centering, but it involves an additional operation of preparation, a source of increased complications and of labor cost.

By means of the particular conception of the pusher head proposed, one succeeds in causing the bar of material to be machined to be sufficiently centered without it being necessary to practice first the conical preparation 9 at the rear of the bar. This is illustrated in FIG. 3.

Figure 3:
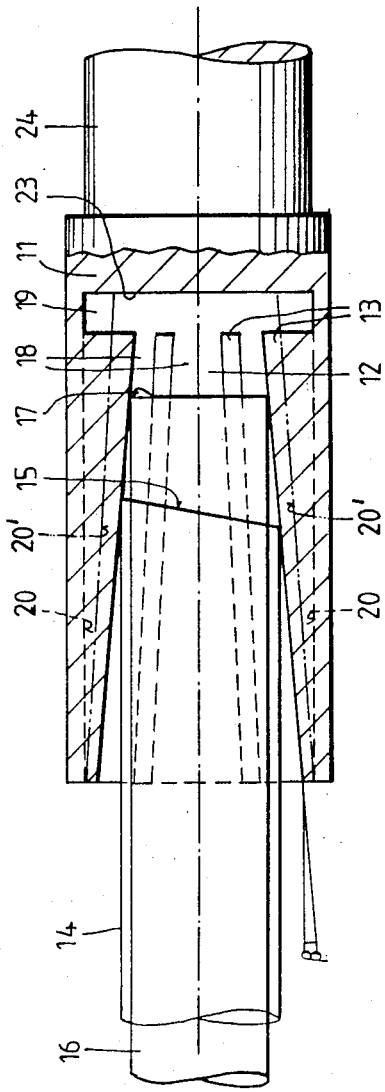
FIG. 3 is a view similar to FIGS. 1 and 2 but relating to the pusher head of the particular type proposed by the invention, this illustration showing that the faults which brought about a decentering in the case of FIG. 1, with a conventional pusher head, or which made it necessary to provide for the preparation shown in FIG. 2, remain without harmful effects in the case of the proposed pusher head, which permits introducing there rear bar ends in rough state, i.e., not prepared by a particular operation.

In this FIG. 3, there has been shown a pusher head 11, in the recess 12 in which a bar of material 14 or a bar of material 16 can be fitted, which respectively present the same faults as the bar of material 4 and the bar of material 6 shown in FIG. 1.

Figure 5:
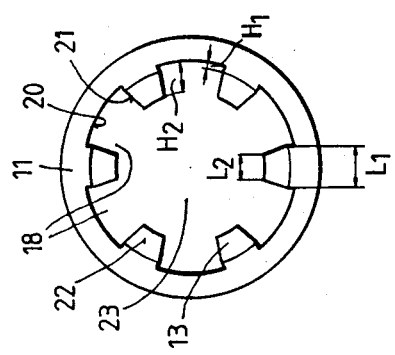
FIG. 5 is an end-on view of the pusher head depicted in FIG. 4.
Figure 4:
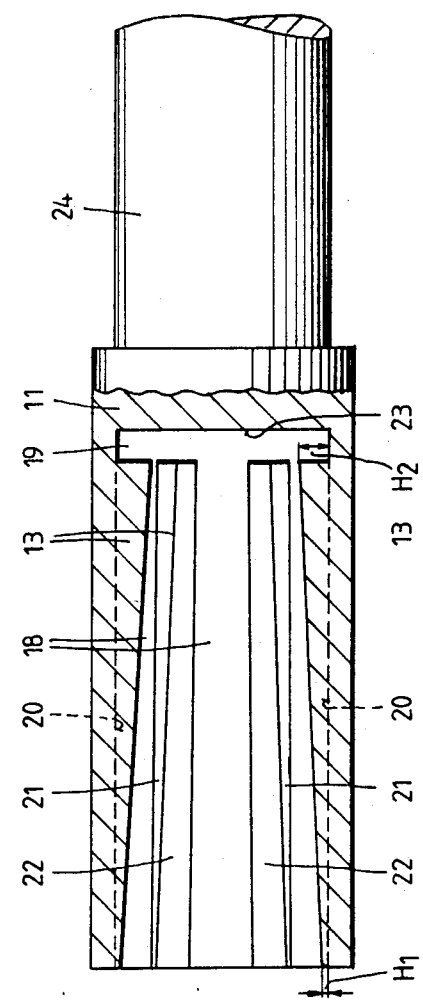
FIG. 4 is a partial longitudinal view in section of a pusher head embodiment in accordance with the invention.

In order to understand well the explanations furnished by FIG. 3, it would already be well to consider FIGS. 4 and 5, which show the pusher head according to the particular conception proposed in an isolated state, i.e., without a bar of material being fitted therein.

It is seen that the recess 12 which must present at least portions of control surfaces is formed in a completely different way.

First of all, its conicity $\beta$ (relative to the longitudinal axis) is much less than the conicity $\alpha$ of the recess 2 of a pusher head according to the prior art. Typically, this conicity is situated in the neighborhood of 4°, according to reasonable variations, it could be situated in the range of 2° to 5°. In addition, it is seen—and this is shown particularly well in FIG. 5—that the conical centering surface is not present over the whole circumference of the recess but only over parts 13 which form ribs projecting toward the center (or the axis) starting from an approximately cylindrical surface shown at 20 (or from a slightly conical surface 20', in a variation illustrated in "double-dot-dash" lines in FIG. 3). The ribs 13 leave between them free spaces 18 which go as far as the level of the surface 20 (or 20').

In FIG. 3, we shall consider first of all the case of the bar of material to be machined 14 of which the rear surface 15, in rough state, presents a certain obliquity. In theory, this obliquity involves a slight decentering of the bar 14 relative to the axis of the pusher head. However, owing to the very low value of the angle of conicity $\beta$, this decentering becomes so slight that it may be disregarded. In the drawing, it is not even possible to depict it, for it would be about the size of the lines of the drawing, or even smaller. Under these conditions, a bar of material to be machined such as the bar 14 can be fitted in rough state in the recess 12 of the pusher head 11, the lack of perpendicularity between its rear face 15 and its axis will be expressed only by a decentering completely negligible in practice.

It is also necessary to consider the fitting of a bar such as the bar 16 which, perhaps having (but this is not certain) a rear face perpendicular to its axis, presents somewhat along the edge of this rough rear face a burr 17 analogous to the burr 7 of the bar 6 of FIG. 1. If this burr has only a small width, then with the pusher head 11 of FIG. 3, it will come to slide automatically into one of the free spaces 18 between the ribs 13, so that it will not disturb the centering of the bar 16. If this burr 17 is wider and comes to butt against a rib, it is forced back by the pressure which the rib, owing to its slight obliquity, exerts upon it nearly radially. Such a forcing-back occurs only thanks to the presence of ribs of slight obliquity (or low conicity).

If the burr is wide, this forcing-back has recourse to the longitudinal edges of the ribs 13, which are relatively sharp and which can shear this too wide burr without difficulty, dividing it thus into parts which then pass behind the bar or into a free space 18.

Thus, as FIG. 3 shows, both the bar 14, having a rough rear surface not perpendicular to its axis, and the bar 16 presenting a burr 17, will be centered at least to an extent sufficient in practice, by being fitted in rough state in the pusher head 11 of FIG. 3. The use of this pusher head therefore permits doing without the preliminary operation of preparation of the rearward end of the bar of material to be machined, which constitutes an important saving on time and expense.

In FIG. 3, as moreover in FIG. 4, it is seen that the ribs 13 do not extend all the way to the back 23 of the recess but that a circular groove 19 exists between this back 23 and the rearward end of the ribs 13. This groove 19 is contrived principally for technological purposes, it serves to avoid there being a direct continuity between the ribs 13 and the back 23. This would, in fact, be unfavorable in the case of a bar whose diameter would be too small for the pusher head in which it is fitted, which means that its rear face would come to butt against the back 23, or more exactly against one of the angles formed by this back and a rib. In the absence of the groove 19, it might happen that a bar of too small a diameter would be fitted under these conditions without the operator's being aware of it. With the groove 19, the operator will certainly be aware of it, only by means of the "fluttering" which would ensue.

FIGS. 4 and 5 depict the pusher head by itself, without a bar fitted. In these figures, it is seen that the ribs 13 all present a frustoconical surface portion 22, these ribs likewise presenting lateral surfaces 21 on each side. Two of these surfaces are visible in the background in the sectional view of FIG. 4. In FIG. 3, these lateral surfaces 21 have not been depicted in order not to overload the drawing.

FIG. 5 clearly shows the configuration of the ribs, with their different surfaces. There have likewise been entered there indications of dimensions which are approximately those of a prototype produced and giving satisfaction, but which might naturally be very significantly modified. First of all, the height of the rib H, i.e., the distance between the frustoconical surface 22 and the surface 20 of the bottom of the free spaces, is a few tenths of a millimeter, or even 1/10 mm, all the way at the front of the pusher head (height $H_1$). On the other hand, at the rear of the ribs 13, this height ($H_2$) reaches close to 4 mm; typically, it is situated between 3.2 and 4.2 mm. The total length of the ribs is approximately 60 mm, which gives a slope of approximately 5.7% corresponding to an angle $\beta$ of approximatley 3°15'.

As the utmost limit for the slope (or the conicity) of the rib surfaces 22, 2.5%, or a little less than 1.5°, may be accepted as the lower limit, and 15%, or about 8°, as the maximum limit. Below the aforementioned lower limit, there would be too large crop-ends, whereas above the aformentioned maximum limit, the centering faults would cease to be negligible in practice. It must be noted in addition that, depending on the angle of conicity, the crop-end will remain "jammed" in the pusher head or not. According to the types of apparatus, one may seek this particularity or, on the contary, want to avoid it. These considerations will permit determining from case to case the conicity $\beta$ which is advantageous.

The width of the portions of frustoconical surfaces 22 is naturally larger toward the front than toward the rear of the ribs. Toward the front, this width $L_1$ is on the order of 4 mm, or even 4.5 mm, whereas toward the rear, it is on the order of 2 to 2.5 mm. This means that the longitudinal section of the ribs, level with the cylindrical surface 20, would be an elongated trapezoidal, not rectangular, section.

In FIGS. 3 and 4, the rear part 24 of the pusher head is further seen. This part 24 may be either constitute the pusher body directly or constitute a portion serving as a plug fitting into a part at least partially tubular, forming the body of the pusher.

For the fabrication of the pusher head, recourse was had, for the fabrication of a prototype, to internal taper turning, followed by turning of the groove 19 in the back of the recess, after which the free spaces 18 were created by mortising. For mass production, faster means will be adopted, including, for example, partial molding of the pusher head. Moreover, it would be advantageous to produce this head in two parts, originally separate and then made integral, e.g., by welding. Thus, the part including the ribs would be completely tubular, and the rear part 24 would then be fitted into the rear of this tabular part and joined to the latter by welding or an analogous process.

One notices that the pusher head according to the particular conception which has just been described is particularly well suited to bars of material to be machined of round or hexagonal cross-section. Other polygonal sections might be envisaged, the number of ribs being equal to the number of sides of the polygon (for example, eight ribs for an octagonal cross-section).

The pusher head depicted in FIGS. 4 and 5 corresponds to a prototype which had an outside diameter of approximately 36 mm, intended for bars of a diameter ranging from 20 to 28 mm. It is clear that pusher heads of any other desired dimensions, for bars of other diameters, might likewise be produced with the same particularities.

It is likewise noted that the notion of frustoconical surface is, in this particular case, to be extended likewise to the notion of surface of slightly ogival shape, in which the angle of inclination would vary somewhat along the ribs, the surfaces directed toward the center thereof then also being slightly curved in the longitudinal direction.

Generally speaking, the device described is applicable to any machine tool fed by an automatic feeder, whether they be machines having mechanical, electronic, or other control.

I claim:

1. A pusher head for a feeder of an automatic lathe wherein the pusher head pushes a rearward end of a bar to be machined in an axial direction of the lathe, the pusher head comprising:

a front recess reception of the rearward end of the bar, the recess having an inside conical surface of reduced conicity not extending 8° relative to the axial direction;

the recess being formed of a plurality of ribs distributed internally and circumferentially of the recess, each rib having a surface directed toward the axis of the pusher head and forming a sector based slice of frustoconical surface defining the reduced conicity of said recess, each rib further having shearing means for shearing burrs located on the rearward end of the bar and contacting the ribs upon reception of the rearward end of the bar in the recess; and a free space defined between each of said ribs for reception of burrs aligned with each free space upon reception of the rearward end of the bar in the recess, the reduced conicity of the recess and the shearing means of the ribs permitting engagement between the recess and the rearward end of the bar that ensures substantial centering of the bar in the pusher head without centering preparation of the rearward end of the bar.

2. The pusher head of claim 6 wherein the shearing means is the longitudinal edges of each rib, the longitudinal edges defining sharp shearing edges for eliminating the burrs.

3. The pusher head according to claim 1 wherein said ribs are six in number, and their surfaces directed toward the axis are sectors of a frustoconical inside surface having an angle of conicity of 2° to 5° relative to the axial direction.

4. The pusher head according to claim 1 wherein the ribs projecting toward the center extend from an approximately cylindrical inside surface which forms the bottom of the free spaces, and have their surfaces directed toward the axis project above the bottom cylindrical surface by about 0.1 to 0.5 at the front of the head and by about 3.2 to 4.2. mm at the back of the recess.

5. The pusher head according to claim 1 wherein the ribs projecting toward the center extend from an inside surface, presenting a certain conicity which forms the bottom of the free spaces, the ribs having their surfaces directed toward the axis projecting above the surface forming the bottom by about 0.1 to 0.5 mm at the front of the head and by about 3.2 to 4.2 mm at the back of the recess.

6. The pusher head according to claim 1 wherein the surfaces of the ribs directed toward the axis and constituting portions of a cone, are wider at the front of the head than at the back of the said recess.

* * * * *